US006971036B2

(12) United States Patent
Freed

(10) Patent No.: US 6,971,036 B2
(45) Date of Patent: Nov. 29, 2005

(54) METHODS AND APPARATUS FOR LOW POWER DELAY CONTROL

(75) Inventor: Mason L. Freed, Walnut Creek, CA (US)

(73) Assignee: OnWafer Technologies, Dublin, CA (US)

( * ) Notice: Subject to any disclaimer, the term of this patent is extended or adjusted under 35 U.S.C. 154(b) by 502 days.

(21) Appl. No.: 10/126,455

(22) Filed: Apr. 19, 2002

(65) Prior Publication Data

US 2002/0172097 A1 Nov. 21, 2002

Related U.S. Application Data

(60) Provisional application No. 60/285,613, filed on Apr. 19, 2001, provisional application No. 60/285,439, filed on Apr. 19, 2001.

(51) Int. Cl.[7] .............................. G06F 1/32; G06F 1/04
(52) U.S. Cl. ..................... 713/322; 713/601; 713/323
(58) Field of Search ...................... 710/262; 713/300, 713/323, 324, 320, 400, 322, 601; 370/503; 340/825.71; 725/150; 455/574

(56) References Cited

U.S. PATENT DOCUMENTS

| | | | | |
|---|---|---|---|---|
| 5,584,031 A | * | 12/1996 | Burch et al. | 713/323 |
| 5,590,341 A | * | 12/1996 | Matter | 713/320 |
| 5,881,361 A | * | 3/1999 | Mannette et al. | 725/150 |
| 5,919,259 A | * | 7/1999 | Dahl | 713/300 |
| 5,937,199 A | * | 8/1999 | Temple | 710/262 |
| 5,969,639 A | | 10/1999 | Lauf et al. | 340/870.17 |
| 5,973,617 A | * | 10/1999 | Reichmeyer et al. | 340/825.71 |
| 6,047,380 A | * | 4/2000 | Nolan et al. | 713/324 |
| 6,244,121 B1 | | 6/2001 | Hunter | 73/865.9 |
| 6,311,081 B1 | * | 10/2001 | Northcutt et al. | 455/574 |
| 6,333,939 B1 | * | 12/2001 | Butler et al. | 370/503 |
| 6,457,135 B1 | * | 9/2002 | Cooper | 713/323 |
| 6,611,922 B2 | * | 8/2003 | Ozcetin et al. | 713/400 |

FOREIGN PATENT DOCUMENTS

WO  WO 02/17030 A2  2/2002

OTHER PUBLICATIONS

"Autonomous Micro-sensor Arrays for Process Control of Semiconductor Manufacturing Processes," Darin Fisher, Mason Freed, Kameshwar Poolla and C. J. Spanos—U.C. Berkeley, Presented: Proceedings of the 38th Conference on Decision and Control- Dec. 7-10, 1999. Presentation on Dec. 10, 1999.

"Micro-sensor Arrays for Calibration, Control, and Monitoring of Semiconductor Manufacturing Processes," Darin Fisher, Mason Freed, Kameshwar Poolla and C. J. Spanos—U.C. Berkeley, Presented: 1999 IEEE International Conference on Control Applications, Aug. 22-26, 1999. Presentation on Aug. 24, 1999.

(Continued)

*Primary Examiner*—Thomas Lee
*Assistant Examiner*—Ji H. Bae
(74) *Attorney, Agent, or Firm*—Larry Williams

(57) ABSTRACT

A method of producing a time delay is provided. The method is performed with an information processor having a first timer and a second timer. The information processor is capable of maintaining a sleep mode. The method involves using the second timer to measure the timeout for the first timer. The method also includes repetitively causing the information processor to enter the sleep mode so as to be awakened by the first timer reaching timeout to substantially produce a time delay while the second timer is disabled.

20 Claims, 3 Drawing Sheets

OTHER PUBLICATIONS

U.S. Appl. No. 09/643,614, filed Mar. 22, 2001, Docket # AWS-002.
U.S. Appl. No. 60/285,439, filed Apr. 19, 2001, Docket # AWS-003.
U.S. Appl. No. 60/285,613, filed Apr. 19, 2001, Docket # AWS-004.
U.S. Appl. No. 10/126,497, filed Apr. 19, 2002, Docket # AWS-025.

* cited by examiner

METHODS AND APPARATUS FOR LOW POWER DELAY CONTROL

CROSS-REFERENCE

The present application claims benefit of U.S. patent application Ser. No. 60/285,613 filed on 19 Apr. 2001 and U.S. patent application Ser. No. 60/285,439 filed on 19 Apr. 2001. The present application is related to U.S. patent application Ser. No. 60/285,613 filed on 19 Apr. 2001, U.S. Pat. No. 6,671,680, filed 19 Apr. 2002, U.S. patent application Ser. No. 60/285,439 filed on 19 Apr. 2001, U.S. Pat No. 6,691,068, filed on 22 Aug. 2000 also published as Patent Corporation Treaty application WO 02/17030, and U.S. patent application Ser. No. 09/816,648, filed on 22 Mar. 2001, now U.S. Pat. No. 6,542,835; all of these applications are incorporated herein, in their entirety, by this reference.

TECHNICAL FIELD

This invention relates to improved methods and apparatus for producing a low power use time delay. More particularly, this invention relates to methods of and apparatus for producing substantially precise time delays with an information processor, such as a microprocessor, using low power so as to provide a low-power time delay.

BACKGROUND

The number of applications for equipment and systems that include the use of information processors such as computers, microprocessors, and central processing units continues to grow dramatically. In addition, there is continued growth in the use of these systems while operating on a substantially limited power supply such as batteries. There are applications in which the information processors require a precisely timed calibrated delay routine in which the power consumption is to be minimized.

Many microprocessors have two built-in clocks that typically use RC (resistor-capacitor) oscillators. One clock offers high accuracy at the expense of high power consumption. The high accuracy clock is typically used to time or schedule critical events. The other clock, which will be referred to as the watchdog timer, is a low power consumption clock, but it is typically very inaccurate. The watchdog timer is typically used to recover from software failures. An alternative solution is to use external components such as a quartz crystal to provide a calibrated delay timer for the information processor. The external components require more space and thus result in larger sizes for the equipment and systems that require the time delay capability.

There is a need for methods and apparatus that allow more efficient use of the available power for devices and systems that use information processors. Particularly, there is a need for methods that can provide accurately timed delays while using the available power for the timing function more efficiently than is possible with the standard technology.

SUMMARY

This invention provides methods of and apparatus for producing substantially precise time delays with an information processor using low power so as to provide a low-power time delay. In one embodiment of the present invention, the method is performed with an information processor having a first timer and a second timer. The information processor is capable of maintaining a sleep mode. The method involves using the second timer to measure the timeout for the first timer. The method also includes repetitively causing the information processor to enter the sleep mode so as to be awakened by the first timer reaching timeout so as to produce a time delay while the second timer is disabled.

It is to be understood that the invention is not limited in its application to the details of construction and to the arrangements of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out aspects of the present invention. It is important, therefore, that the claims be regarded as including such equivalent constructions insofar as they do not depart from the spirit and scope of the present invention.

The above and still further features and advantages of the present invention will become apparent upon consideration of the following detailed descriptions of specific embodiments thereof, especially when taken in conjunction with the accompanying drawings.

DESCRIPTION

Figure 1:
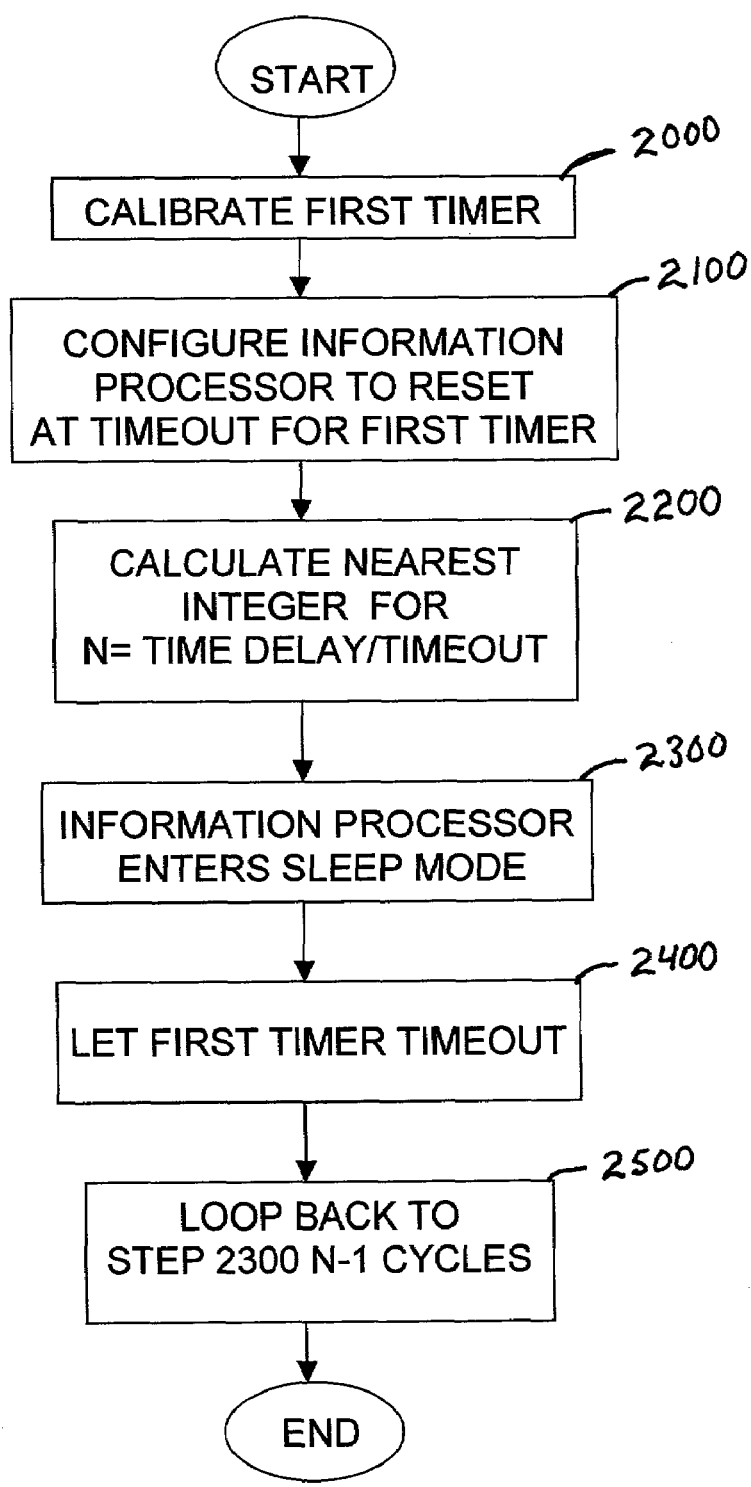
FIG. 1 is a flowchart for an embodiment of the present invention.

The operation of embodiments of the present invention will be discussed below, primarily, in the context of using an information processor to produce a time delay while conserving power during the delay. More specifically, the embodiments described are directed toward methods of and computer program products for operating a microprocessor to produce a time delay while using a reduced amount of power for performing the timing function. However, it is to be understood that embodiments in accordance with the present invention may be used for essentially any application where an apparatus, such as a microprocessor-based device, is used for periodic activities, such as information transfer, data logging, process control, and process monitoring and the apparatus needs to be capable of conserving power, possibly because of a limited power supply.

In the following description of the figures, identical reference numerals have been used when designating substantially identical elements or steps that are common to the figures.

Reference is now made to FIG. 1 wherein there is shown a flowchart for an embodiment of the present invention. The steps presented in the flowchart can be encoded as executable software steps that can be carried out in a device that includes an information processor such as a microprocessor and such as a computer. The information processor for use with the flowchart includes a timer such as a watchdog timer commonly used in microprocessors. For the embodiment shown in FIG. 1, the first step after starting the program is step 2000, which involves measuring the timeout interval for the watchdog timer, referred to as WDTTIMEOUT, so as to obtain an accurate measure of the timeout interval.

The next step shown in FIG. 1 is step 2100, which includes configuring the microprocessor to reset in response to the watchdog timer timeout. FIG. 1 shows step 2200 after step 2100. Step 2200 involves calculating the number of watchdog timer timeout intervals, N, that equal or approximately equal a desired or predetermined delay time. The value of N is taken as the nearest integer to the result of the delay time divided by WDTTIMEOUT.

The flowchart shown in FIG. 1 indicates the start of a loop after the value of N has been determined. The loop is done for a total of N−1 repetitions. The first step in the loop is step 2300 in which the microprocessor is put into a sleep mode. The sleep mode is a reduced power consumption mode for the microprocessor. The sleep mode is obtained by turning off or reducing the power to one or more functions of the microprocessor. For a preferred embodiment of the present invention, the sleep mode includes turning off the high accuracy clock in the microprocessor so as to reduce the power consumption by the microprocessor. Rather than using the high accuracy clock, the microprocessor uses the watchdog timer for timing control.

Step 2400 follows step 2300 shown in FIG. 1. In step 2400, the watchdog timer starts and runs until it times out. The microprocessor has been configured so that when the watchdog timer times out, the microprocessor resets. In other words, the microprocessor terminates the sleep mode when the watchdog timer times out. Each termination of the sleep mode completes one repetition in the loop. The loop begins again by returning back to step 2300 and repeating for N−1 repetitions. This means that the total delay time produced by the flowchart shown in FIG. 1 is equal to N multiplied by WDTTIMEOUT.

In a typical microprocessor, there is a high accuracy clock used by the microprocessor for the standard operation of the microprocessor. In addition, a typical microprocessor includes a watchdog timer that is used by the microprocessor during reduced function activities such as rebooting the microprocessor and such as failure recovery for the microprocessor. The operation of the high accuracy clock consumes more power than the operation of the watchdog timer. For the embodiment of the present invention shown in FIG. 1, only the watchdog timer is required during most of the delay. This means that the embodiment shown in FIG. 1 provides a delay that requires lower power consumption than would be required for using the high accuracy clock to control the delay.

A variety of methods can be used for measuring the timeout interval for the watchdog timer as described for step 2000 in the flowchart shown in FIG. 1. In one embodiment of the present invention, the timeout interval is measured using the high accuracy clock incorporated in the microprocessor. More specifically, the measurement involves using the high accuracy clock to determine the time between the start of the watchdog timer through to the watchdog timer timeout so as to obtain the WDTTIMEOUT. The exact steps that can be used in performing step 2000 may depend on the capabilities of the microprocessor.

Figure 2:
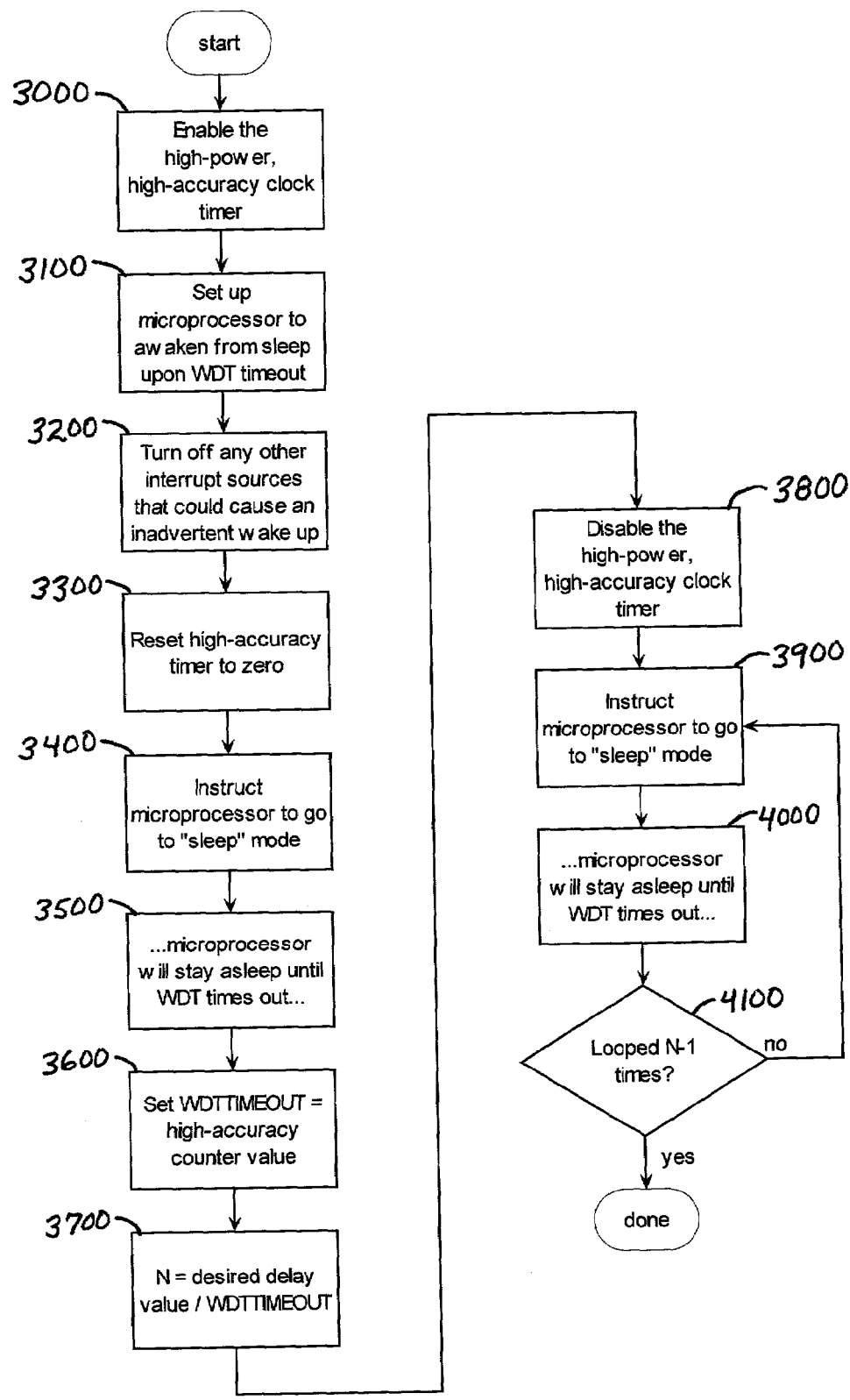
FIG. 2 is a flowchart for an embodiment of the present invention.

Reference is now made to FIG. 2 wherein there is shown a flowchart for another embodiment of the present invention. The flowchart shown in FIG. 2 can be implemented in an information processor such as a microprocessor. For purposes of this description, the information processor is a microprocessor having a watchdog timer and a high accuracy clock. The microprocessor is also capable of maintaining a sleep mode in which power used by the microprocessor is reduced by partially or completely shutting down some of the functions of the microprocessor. The microprocessor is capable of allowing the watchdog timer and the high accuracy clock to operate during the sleep mode.

The first step in the flowchart shown in FIG. 2, after the start, is step 3000. Step 3000 involves enabling the high accuracy clock so that the clock is ready for providing timing capabilities. If the clock is already enabled, then step 3000 can be skipped. The flowchart in FIG. 2 next shows step 3100, which involves configuring the microprocessor to awaken from the sleep mode when the watchdog timer reaches a timeout. It is to be understood that some microprocessors may have, as an inherent feature, a configuration for awakening from sleep mode upon timeout of the watchdog timer; step 3100 may not be needed for microprocessors with such a configuration.

The flowchart in FIG. 2 next shows step 3200, which is a precautionary step to prevent incorrect measurements of the timeout for the watchdog timer. Step 3200 involves substantially isolating the microprocessor so that the microprocessor is awakened exclusively by having the watchdog timer reach timeout. Step 3200 is unnecessary in embodiments of the present invention for which inadvertent awakening of the microprocessor is unlikely. Furthermore, the need for step 3200 will depend upon the amount of error that can be tolerated for the particular applications. In other words, if the error tolerance is low then step 3200 is preferably included in the embodiment; if the error tolerance is high then step 3200 may not be necessary for the embodiment.

Step 3300 in the flowchart in FIG. 2 involves preparing the high accuracy clock for measuring the time interval, WDTTIMEOUT, for timeout of the watchdog timer. In preferred embodiments of the present invention step 3300 involves setting the high accuracy clock to 0. Setting the high accuracy clock to 0 at the start of measuring the watchdog timer timeout avoids the need for a subtraction step to get the time interval.

After setting the high accuracy clock to 0, the microprocessor goes into sleep mode. The start of the sleep mode is indicated in step 3400 in the flowchart shown in FIG. 2. The watchdog timer starts at the start of the sleep mode. Step 3500 indicates maintaining the microprocessor in sleep mode until the watchdog timer reaches timeout. In other words, the microprocessor sleeps through the entire time interval for timeout of the watchdog timer; when the watchdog timer reaches timeout, the microprocessor awakens.

After the watchdog timer reaches timeout in step 3500, the next step shown is step 3600 which includes setting WDTTIMEOUT equal to the time indicated by the high accuracy clock substantially at the time the microprocessor awakened in step 3500. The result of step 3600 is to have a measure of the time interval between starting the watchdog timer and having the watchdog timer reach timeout.

With knowledge of the value of the WDTTIMEOUT, the number of repetitions of the WDTTIMEOUT to equal or approximate a desired time delay can be calculated. The calculation is indicated in step 3700. Generally, the desired time delay is a predetermined quantity that may be provided by a user of embodiments of the present invention. The number of repetitions, N, is the integer calculated by dividing the time delay by the WDTTIMEOUT.

Step 3800 involves disabling the high accuracy clock. This is done to further reduce the power consumption by the microprocessor. The power saved by disabling the high accuracy clock further increases the power conservation capabilities for embodiments of the present invention.

The flowchart shown in FIG. 2 illustrates a loop that includes step 3900 and step 4000. In step 3900, the microprocessor enters the sleep mode. Rather than using the high accuracy clock, the microprocessor uses the watchdog timer for timing control. The watchdog timer starts and runs until it times out. The microprocessor was configured in step 3100 so that when the watchdog timer reaches timeout, the microprocessor awakens from the sleep mode, as shown as step 4000 in the flowchart of FIG. 2. In other words, the microprocessor terminates the sleep mode when the watchdog timer times out. Each termination of the sleep mode completes one repetition in the loop. The number of cycles through the loop is tracked in step 4100. The loop begins again by returning to step 3900. In a preferred embodiment of the present invention, a total number of cycles through the loop is set equal to the number of repetitions, N, minus one, i.e., N−1, so that step 4100 allows the loop to cycle for N−1 repetitions. This means that the total delay time produced by the flowchart shown in FIG. 2 is equal to N multiplied by the WDTTIMEOUT.

According to the flowchart shown in FIG. 2, the microprocessor is in sleep mode for a time interval equal to the product of N and the WDTTIMEOUT, which is approximately equal to the delay time. In addition, the high accuracy clock is on for a time interval equal to the WDTTIMEOUT. The time delay, produced by the embodiment of the present invention illustrated in FIG. 2, can be achieved with power conservation by the microprocessor because the microprocessor is in sleep mode substantially throughout the time delay and the high accuracy clock is enabled only for a time interval substantially equal to the WDTTIMEOUT.

As an alternative to embodiments of the present invention illustrated in FIG. 2, embodiments of the present invention may include an information processor, such as a microprocessor, which includes a high accuracy clock that is inoperable when the information processor is in sleep mode. For the specific case of a microprocessor, this means that the high accuracy clock in the microprocessor is functional only when the microprocessor is not in sleep mode.

Figure 3:
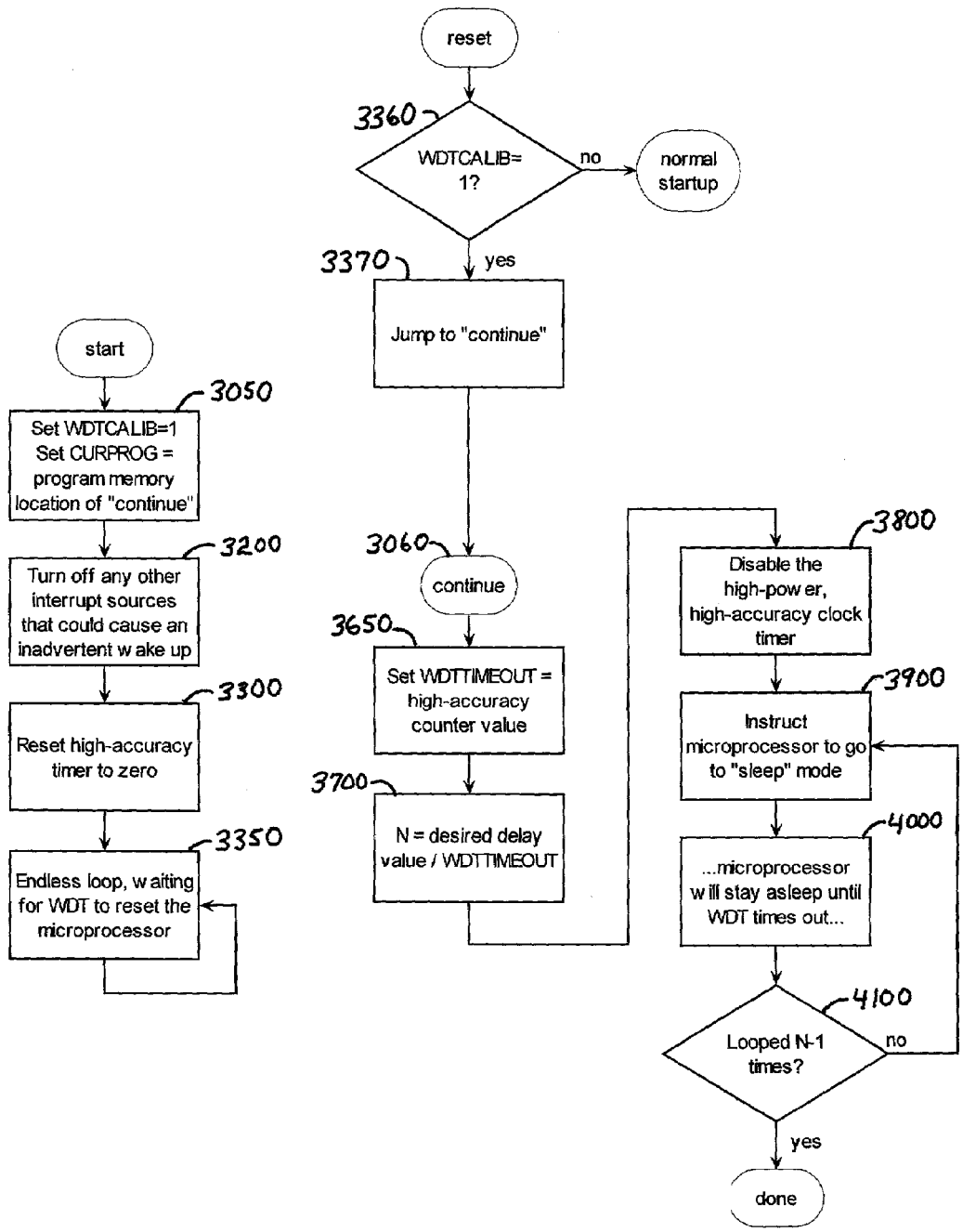
FIG. 3 is a flowchart for an embodiment of the present invention.

Reference is now made to FIG. 3 wherein there is illustrated a flowchart for an embodiment of the present invention that includes a microprocessor having a high accuracy clock and a watchdog timer. The microprocessor is capable of maintaining a sleep mode in which power consumption is reduced by disabling or reducing the functionality of one or more capabilities of the microprocessor. For this embodiment of the present invention, the microprocessor is incapable of allowing the high-accuracy clock to operate during the sleep mode.

The flowchart illustrated in FIG. 3 shows step 3050 after the start. In one embodiment, step 3050 includes setting a variable that indicates that the watchdog timer is being recalibrated. In this case, the variable WDTCALIB is set equal to 1. In addition, the current program memory location is recorded in a non-volatile memory location, i.e., set CURPROG equal to the program memory location of continue step 3060.

FIG. 3 shows steps 3200 and 3300 following step 3050. Steps 3200 and 3300 are essentially the same as those described for the embodiment illustrated in FIG. 2. Step 3200 involves substantially isolating the microprocessor so that the microprocessor is awakened exclusively by having the watchdog timer reach timeout. Step 3200 is unnecessary in embodiments of the present invention for which inadvertent awakening of the microprocessor is unlikely or is acceptable. Step 3300 involves preparing the high accuracy clock for measuring the time interval, WDTTIMEOUT, for timeout of the watchdog timer. In preferred embodiments of the present invention step 3300 involves setting the high accuracy clock to 0.

Step 3350 follows step 3300 in the flowchart of FIG. 3. Step 3350 is essentially an endless loop for waiting for the watchdog timer to timeout so that the microprocessor is reset. When the microprocessor is reset, the microprocessor returns to the start of the program. During step 3350, step 3360 is executed which involves checking to determine if the WDTCALIB variable equals 1. If the WDTCALIB variable equals 1, then the step after step 3360 is step 3370 wherein the flowchart jumps to continue step 3060, i.e., the program memory address stored in memory. If the WDTCALIB variable does not equal 1, then the next step is step 3375 for performing a normal start up wherein a normal start up includes the procedures run by the microprocessor for its intended use, assuming that the watch dog timer is correctly calibrated.

Step 3650 follows continue step 3060. Step 3650 includes setting WDTTIMEOUT equal to the time indicated by the high accuracy clock substantially at the time the microprocessor is reset in step 3350. The result of step 3650 is to have a measure of the time interval between starting the watchdog timer and having the watchdog timer reach timeout.

The flowchart illustrated in FIG. 3 further shows the remaining steps 3700, 3800, 3900, 4000, and 4100. The remaining steps 3700, 3800, 3900, 4000, and 4100 shown in FIG. 3 are essentially the same as the steps 3700, 3800, 3900, 4000, and 4100 described for the embodiment illustrated in FIG. 2. The description for steps 3700, 3800, 3900, 4000, and 4100 will not be repeated here.

Unlike the standard technology for producing a time delay, embodiments of the present invention do not require external timing hardware that could require a larger physical size than is required for embodiments of the present invention. In addition, embodiments of the present invention do not require as much use of the high accuracy clock for timing operations as is required for the standard technology. Some embodiments of the present invention are capable of providing precise delay timing and low power consumption during the delay in a relatively compact size.

The watchdog timers described for some embodiments of the present invention can be substituted with substantially any device that can provide a low-power timeout period. Many of the commercially available information processors, such as microprocessors, include the watchdog timer function. The methodology of maintaining a sleep-mode and using a high-accuracy clock methodology can be substituted with substantially any method that can be used for calibrating the low-power, low-accuracy timer, such as the watchdog timer.

Embodiments of the present invention may be implemented in substantially any microprocessor-based application that uses a microprocessor that includes a watchdog timer, a low-power sleep mode, and a high-accuracy clock. In preferred embodiments, the microprocessor is capable of running the clock during the sleep mode. An example embodiment of the present invention includes data-logging modules used for recording data at predetermined time intervals wherein there is reduced power consumption. Some embodiments of the present invention include batteries as the source of power for the timing operations; the power conservation capabilities described herein can reduce the power drain on the batteries.

The flowcharts shown in FIG. 1, FIG. 2, and FIG. 3 illustrate embodiments of the present invention. It will be cleared to those skilled in the art that the steps shown in these figures can be altered so as to obtain other embodiments of the present invention. Furthermore, even the order in which some of the steps are executed can be altered so as to obtain other embodiments of the present invention.

The steps of the flowchart can be implemented as software code using standard computer programming techniques. As is known to those skilled in the art, a variety of programming languages can be used such as assembly language, such as C, such as C++, and such as BASIC for embodiments of the present invention. Optionally, the software may be broken up into multiple files for easier readability. The software may employ subroutines for performing particular actions and commands.

Specific software commands and structures may be dependent upon the particular hardware configuration that will use the software. In the spirit of providing a general description of the software, the following description emphasizes novel features and critical features for embodiments of the present invention. Obvious hardware dependent generalities may not be described here unless necessary. In addition, details may not be given for well-known support algorithms such as error handling, device initialization, peripheral drivers, information transfer, and other general types of command execution.

FIGS. 1–3 are flowcharts and control flow illustrations of methods, systems and program products according to the invention. It will be understood that each step of the flowchart and control flow illustrations, and combinations thereof can be implemented by computer program instructions. These computer program instructions may be loaded onto a computer or other programmable apparatus to produce a machine, such that the instructions that execute on the computer or other programmable apparatus create means for implementing the functions specified in the flowchart. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart.

Accordingly, steps of the flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of producing a time delay, the method performed with an information processor having a first timer and a second timer the information processor being capable of maintaining a sleep mode, the method comprising the steps of:
   a) arranging the information processor so as to terminate the sleep mode when the first timer reaches timeout;
   b) using the second timer to measure the timeout for the first timer;
   c) disabling the second timer; and
   d) repetitively causing the information processor to enter the sleep mode and causing the information processor to be awakened by the first timer reaching timeout so as to substantially produce the time delay.

2. The method of claim 1 wherein the information processor comprises a microprocessor.

3. The method of claim 1 wherein step d includes a number of repetitions equal to the nearest integer value of the time delay divided by the timeout for the first timer.

4. The method of claim 1 wherein the information processor comprises a microprocessor and step b comprises running the second timer while the microprocessor is in the sleep mode and running the first timer until the first timer reaches timeout.

5. The method of claim 1 wherein step b comprises running the second timer while running the first timer until the first timer reaches timeout.

6. The method of claim 4 wherein step d includes a number of repetitions equal to one subtracted from the nearest integer value of the time delay divided by the timeout for the first timer.

7. The method of claim 5 wherein step d includes a number of repetitions equal to one subtracted from the nearest integer value of the time delay divided by the timeout for the first timer.

8. The method of claim 1 wherein step b comprises setting the second timer to 0 at the beginning of calibrating the first timer.

9. The method of claim 1 wherein step b comprises disabling at least one possible interrupt source.

10. An apparatus for producing a time delay comprising an information processor having a first timer and a second timer, the information processor being capable of producing a sleep mode, the first timer having an upper time limit, the information processor being configured so as to awaken from the sleep mode in response to the first timer reaching the upper time limit, the information processor being capable of using the second timer to measure the upper time limit for the first timer, the information processor being capable of entering the sleep mode and running the first timer so as to cause the information processor to awaken from the sleep mode, the information processor being capable of entering the sleep mode and being awakened for a number of repetitions so as to produce the time delay.

11. The apparatus to claim 10 wherein the number of repetitions is an integer value of the time delay divided by the upper time limit.

12. The apparatus of claim 10 wherein the first timer requires less power for operation than the second timer.

13. The apparatus of claim 10 wherein the first timer has lower accuracy than the second timer.

14. The apparatus to claim 10 wherein the information processor comprises a microprocessor.

15. The apparatus to claim 10 wherein the information processor comprises at least one of a microprocessor, a computer, and a central processing unit.

16. The apparatus of claim 10 wherein the first timer comprises a watchdog timer.

17. The apparatus of claim 10 wherein the second timer comprises a high accuracy clock.

18. The apparatus of claim 10 further comprising a substantially fixed power supply.

19. An apparatus for producing a time delay with low-power consumption, the apparatus comprising a microprocessor having a watchdog timer and a high accuracy clock, the microprocessor being capable of producing a sleep mode, the watchdog timer having an upper time limit, the microprocessor being configured so as to awaken from the sleep mode in response to the watchdog timer reaching the upper time limit, the microprocessor being capable of using the high accuracy clock to measure the upper time limit for the watchdog timer, the microprocessor being capable of entering the sleep mode and running the watchdog timer so as to cause the microprocessor to awaken from the sleep mode, the microprocessor being capable of entering the sleep mode and being awakened for a number of repetitions so as to produce the time delay with the high accuracy clock disabled, wherein the watchdog timer requires less power than is required by the high accuracy clock, and wherein the high accuracy clock is more accurate for measuring time than is the watchdog timer.

20. The apparatus of claim 19 further comprising a battery connected so as to provide power to the watchdog timer and the high accuracy clock.

\* \* \* \* \*